June 7, 1949.  F. W. KRUEGER  2,472,664
APPARATUS FOR CAPPING CONTAINERS
Filed July 3, 1944  12 Sheets-Sheet 1

FIG.1

INVENTOR:
FRANK W. KRUEGER
BY
ATTORNEY

June 7, 1949.　　　F. W. KRUEGER　　　2,472,664
APPARATUS FOR CAPPING CONTAINERS
Filed July 3, 1944　　　12 Sheets-Sheet 7

INVENTOR:
FRANK W. KRUEGER

BY

ATTORNEY

June 7, 1949. F. W. KRUEGER 2,472,664
APPARATUS FOR CAPPING CONTAINERS
Filed July 3, 1944 12 Sheets-Sheet 12

FIG.18 FIG.19

INVENTOR:
FRANK W. KRUEGER
BY

ATTORNEY

Patented June 7, 1949

2,472,664

UNITED STATES PATENT OFFICE 2,472,664

APPARATUS FOR CAPPING CONTAINERS

Frank W. Krueger, Atherton, Calif., assignor to Food Machinery and Chemical Corporation, a corporation of Delaware Application July 3, 1944, Serial No. 543,336

8 Claims. (Cl. 226—116)

This invention relates to the art of capping containers and is especially useful in capping glass jars.

It is an object of my invention to provide a novel method of and apparatus for vacuum capping containers.

A further object of my invention is to provide a method of and apparatus for capping containers which is adjustable to handle containers of various sizes.

A still further object of my invention is to provide a novel method of and apparatus for vacuum capping containers by the use of steam.

Difficulty is experienced in the manufacture of certain containers such as glass jars so that the neck on the jar which is provided to receive the cap contains imperfections which renders it difficult to cap the jar.

It is a still further object of my invention to provide a method of and apparatus for capping containers which is automatically adaptable to the container so that such defects do not impair the character of the seam made in the capping operation.

In jar capping operations, there is some tendency for the cap to stick in the chuck which applies it thereby weakening the seal between the cap and the container when the latter is discharged from the chuck.

It is an object of my invention to provide an apparatus for capping containers in which all tendency to weaken the seal from this source is eliminated.

In machine capping jars difficulty is experienced, because of the lack of uniformity in the height of the jars, to keep from applying such a pressure to the taller of these jars as will break them while they are still in the capper.

Yet another object of my invention is to provide an apparatus for capping jars in which the capping pressure is automatically held down to a value which the jars are able to stand without breakage.

Still another object of my invention is to provide an apparatus for vacuum capping containers by the use of steam and embodying a novel and relatively simple mechanism for supplying the steam for use in capping operations.

Containers and particularly jars are commonly capped by sheet metal caps provided with a thin layer of sealing material in the peripheral area of the cap which engages the container. I have discovered that any failures to effect a good seal between the cap and the container may be overcome by the use of a concave beveled surface on the bottom of the capper head where this engages the peripheral container engaging portion of the cap.

It is therefore a still further object of my invention to provide an apparatus for capping containers and particularly glass jars giving an improved seal between the cap and the jar.

The manner of accomplishing the foregoing objects as well as further objects and advantages will be made manifest in the following description taken in connection with the drawings in which.

Figure 1:
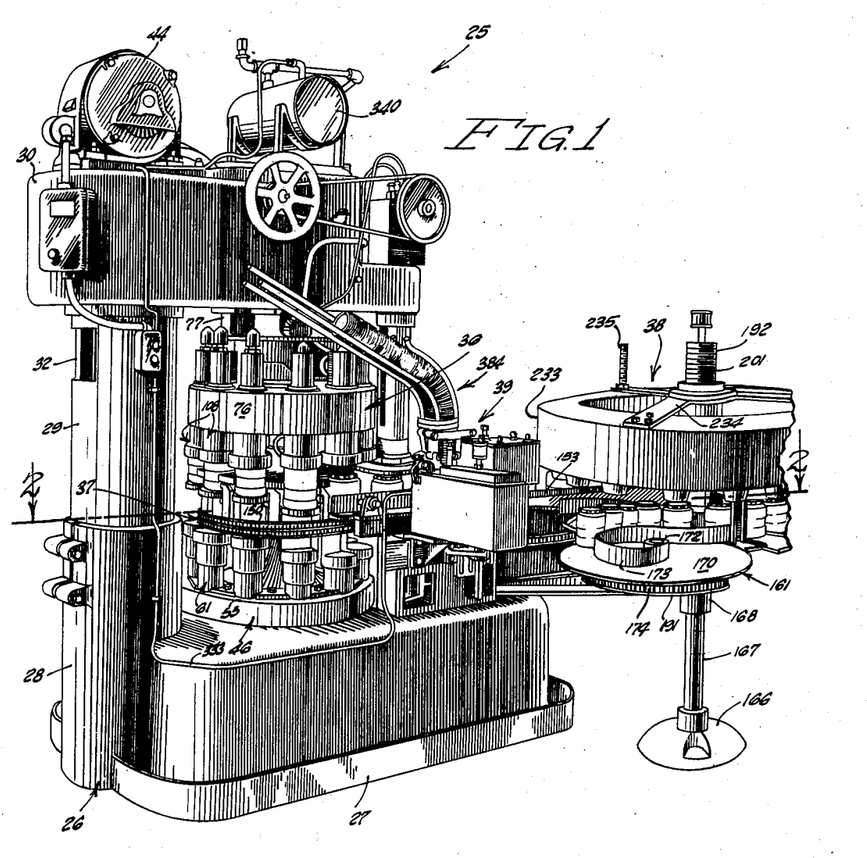
Fig. 1 is a perspective view of a preferred embodiment of the apparatus of the invention.
Figure 2:
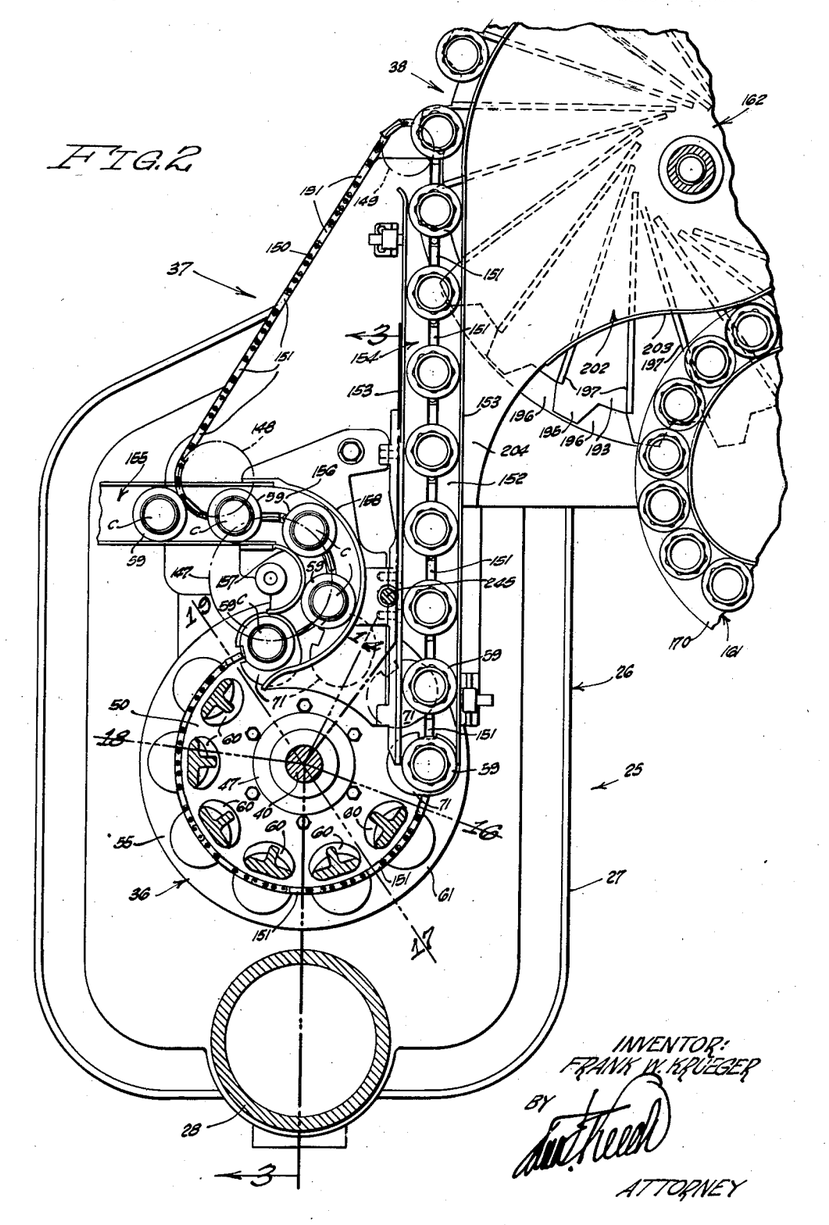
Fig. 2 is a diagrammatic horizontal sectional view taken on the line 2—2 of Fig. 1 and illustrates the container delivery and discharge mechanism of the invention.
Figure 3:
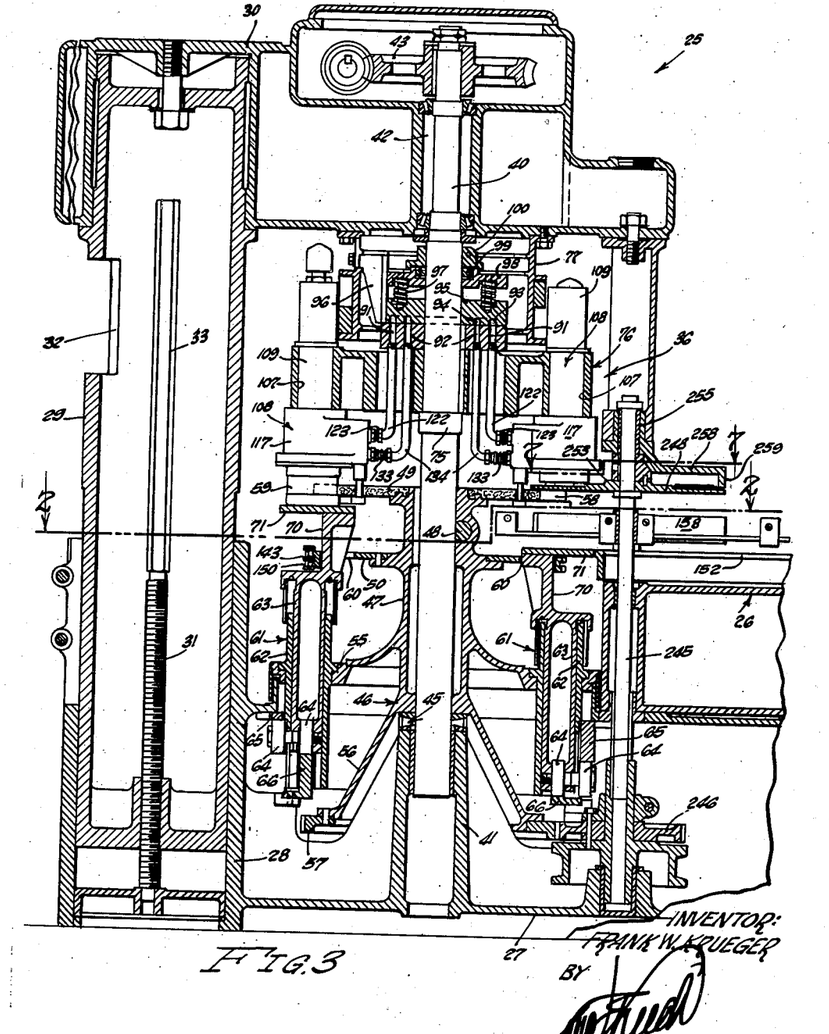
Fig. 3 is a fragmentary vertical sectional view taken on the line 3—3 of Fig. 2.

As my invention is especially useful in the capping of glass jars, it is disclosed herein as associated with a jar capper 25 (see Figs. 1, 2 and 3). This capper includes a main frame 26 having a base 27, at one end of which is formed a column well 28 in which a tubular column 29 of a power head 30 is received so as to be vertically adjusted therein by a screw 31. To accomplish this adjustment a wrench may be applied through a window 32 in the column 29 to a hexagonal shank 33 provided on said screw. Mounted between the base 27 and the power head 30 and rotatable about a vertical axis is a capping rotor 36 which receives jars and caps fed thereto and applies the caps to the jars. The jars are delivered to and discharged from the rotor 36 by a delivery and discharge mechanism 37 which is fully illustrated and described in my co-pending application for U. S. Letters Patent Serial No. 543,337, filed July 3, 1944, now Patent No. 2,454,285, dated Nov. 23, 1948. Caps are fed to the capping rotor 36 by a cap feeding device 39 which is described in detail in my co-pending application for U. S. Letters Patent Serial No. 543,338, filed July 3, 1944, now Patent No. 2,417,938, dated March 25, 1947.

*The capping rotor 36*

This rotor is mounted on a vertical mandrel 40 which journals in bearing 41 on the base 27 and bearing 42 on the power head 30. The mandrel 40 is rotated through a worm gear 43 by an electric motor 44 mounted on the power head 30. Surrounding the lower end of the mandrel 40 and resting on a thrust bearing 45 which in turn rests on the bearing 41 is an elevator unit 46. This unit includes a hub 47 which is adjustably secured by a lock 48 to the mandrel 40 and has provided thereon a jar locating disc 49, a sprocket 50, an elevator guide platform 55 and a conical shell 56 on which is provided a cap feeder actuating gear 57.

The jar locating disc 49 is provided with arcuate notches 58 in its periphery for receiving and locating jars 59 being handled by the rotor 36.

The sprocket 50 has a series of openings 60 therein. Mounted on the guide platform 55 is a series of elevators 61 each of which includes a cylindrical guide sleeve 62 in which a tubular elevator plunger 63 is reciprocated vertically by engagement of rollers 64 on the lower end thereof with cams 65 and 66. Each elevator plunger 63 has a neck 70 at its upper end which extends through one of the openings 60 in the sprocket 50 and carries a table 71 on its upper end which overlaps the periphery of the sprocket 50.

Figure 12:
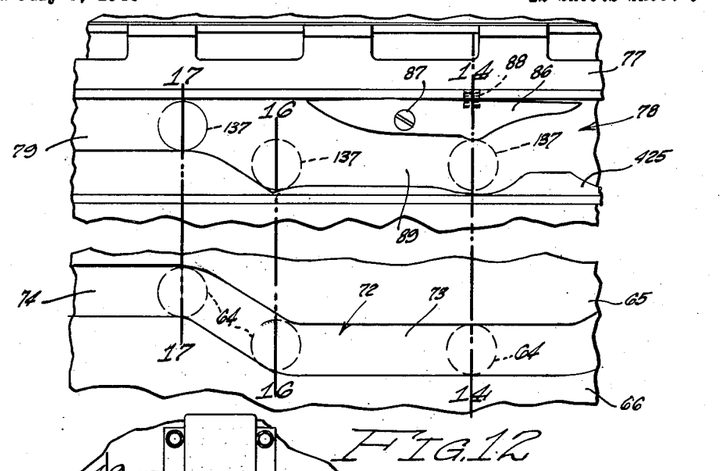
Fig. 12 is a diagrammatic development of corresponding 180 degree sections of the table elevator and capping cams of the invention.
Figure 13:
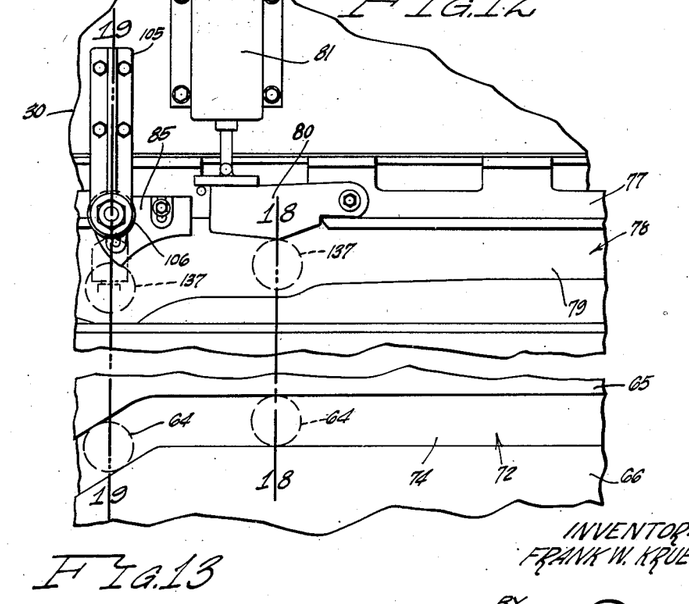
Fig. 13 is a similar view of the other 180 degree sections of said table elevator and capping cams.

The cams 65 and 66 unite to define a cam path 72 illustrated in the lower portions of Figs. 12 and 13, this cam path having a low portion 73 and a high portion 74.

Fixed on the mandrel 40 and supported on a collar 75 of the latter is a capper head platform 76.

Secured to the power head 30 is an annular cam 77, an elevational development of which is shown in Figs. 12 and 13. This cam provides a cam track 78 having an upper portion 79 at the end of which is provided a pivoted cam wall 80 which is yieldably pressed towards an adjusted downward position by a constant pressure air cylinder 81. Following the cam wall 80 is an adjustable upper cam wall 85 causing the cam path 78 to descend sharply. Following the cam wall 85 is an upper cam wall 86 pivoted on a screw 87 and spring pressed downward by a spring 88. Following the lowermost point of contact on the upper cam wall 86 is a lower portion 89 of the cam path 78 which terminates in a sharp rise to the beginning of the upper portion 79 of the cam path 78.

Resting on top of the capper head platform 76 and keyed to rotate therewith is a lower steam manifold 90 having a series of steam holes 91 and exhaust holes 92 which connect respectively with an annular steam passage 93 and an annular exhaust passage 94 in a plate 95 which is held against rotation by a key 96 fixed on the cam 77. The plate 95 is pressed downwardly against the manifold 90 by springs 97 which bear against a collar 98 upward movement of which is prevented by a bearing 99 resting against a collar 100 which is fixed upon the mandrel 40.

Mounted on the lower end of a bracket 105 (see Fig. 13) which is fixed on the power head 30 is a fixed cam roller 106, this roller being disposed just following the lowermost point in the adjustable upper cam wall 85.

Mounted in a series of bores 107 provided in the rotary capper head platform 76 is a series of capper units 108. Each of the capper units 108 (see Figs. 14 to 19 inclusive) has a tubular body 109 having a bore 110 containing bushings 111 and with a counterbore 112 at its upper end. The body 109 has a shoulder 113 which rests on the upper face of the platform 76 and a vertical slot 114 is provided inwardly from the counterbore 112. Provided on the lower end of the body 109 and concentric therewith is a cylinder 117 having a chamber 118 the upper end of which is vented to the atmosphere at 119. Formed integral with the cylinder 117 is a valve unit 120 which provides a steam reception chamber 121 with which a steam pipe 122 connects through a flexible sylphon 123. The chamber 121 is connected by a passage 124 to a plugged steam injection passage 125. Extending downwardly from the passage 125 coaxially with the passage 124 is a threaded bore 126. Closing the upper end of the chamber 121 and located coaxially with the passage 124 is a plug 127.

The jar locating disc 49 is disposed close below the lower end of the valve units 120 and has holes 128 each of which is coaxial with the bore 126.

Disposed in the chamber 121, passage 124, passage 125, bore 126 and hole 128 is a valve member 129 which has threaded engagement with the threads of the bore 126 so as to rotate when it is moved vertically as well as move vertically when it is rotated. This valve member is constantly pressed downwardly by a spring 130 between the head of the valve and the plug 127 so that unless held open this valve is normally closed. Fixed on the lower end of the valve member 129 is a jar responsive arm 131 which is adapted when engaged by a jar 59 as shown in Figs. 16, 17, 18 and 19, to open the valve member 129 to permit steam to flow from the chamber 121 through the passage 124 and 125 and into the cylinder chamber 118 providing the inner end of the passage 125 is open.

Also provided in the valve unit 120 is an exhaust passage 132 (Fig. 15) which connects through a flexible sylphon coupling 133 to an exhaust pipe 134. The steam pipe 122 and exhaust pipe 134 tap into threaded lower ends of the steam and exhaust holes 91 and 92 in the steam manifold 90.

Slideable in the chamber 118 of each cylinder 117 is a plunger 135, this being mounted on the lower end of a tube 136 which is vertically slideable in the bushings 111 and carries at its upper end a cam roller 137 which travels in the cam track 78. The plunger 135 has an expansive seal ring 135—a near its upper end and a thin valve sleeve 135—b at its lower end. Suspended by a ball and socket joint 138 on the plunger 135 is a capper head 139 having beveled concave cap engaging surfaces 140 which are adapted to press against a peripheral portion of a cap C. Provided on the capper head 139 is a cap chuck 141 comprising a series of spring pressed jaws 141—a which are adapted to yield when the capper head is pressed downward on a cap and then pick up said cap when said capper head returns upward.

Figures 18, 19:
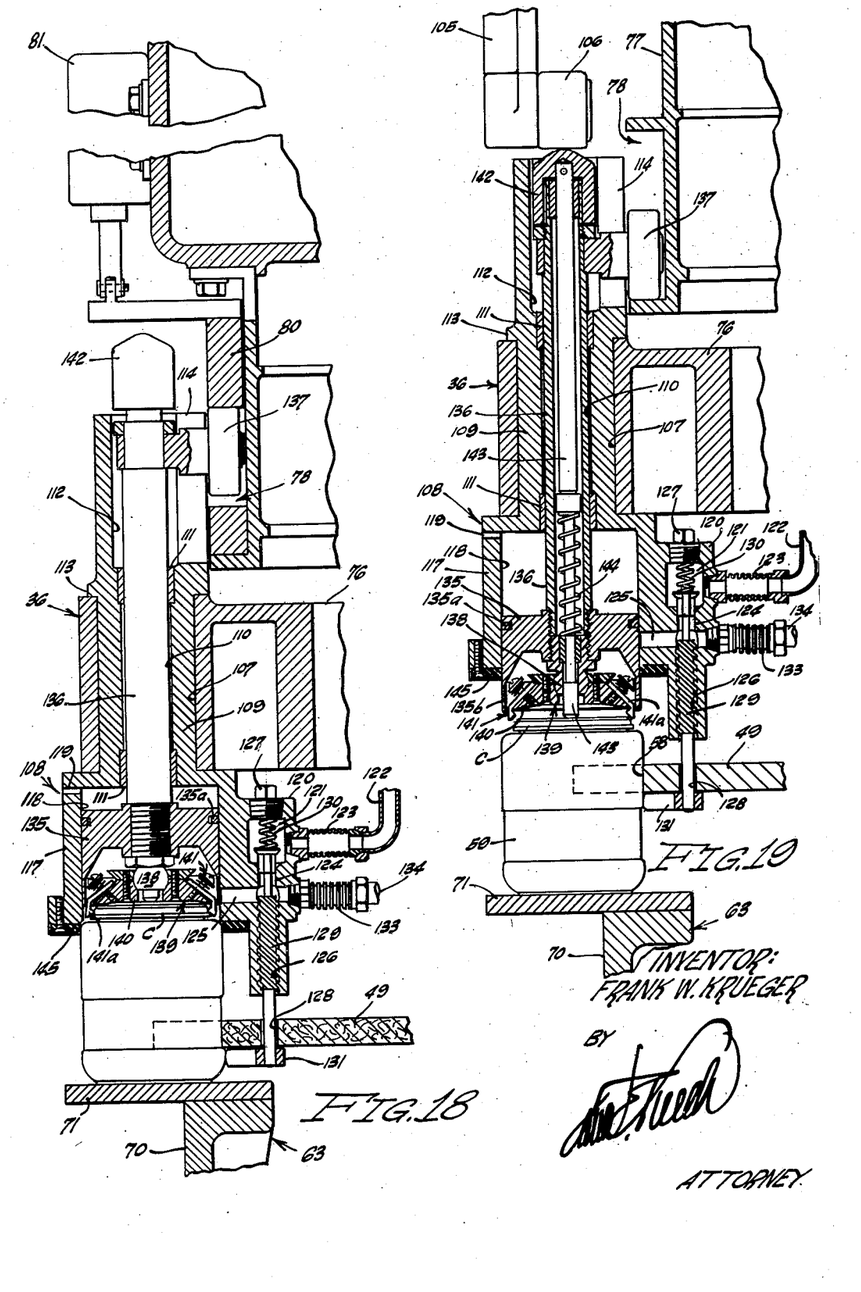
Fig. 18 is a similar view taken on the radial line 18 of Fig. 2 and line 18—18 of Fig. 13 and illustrates the capper head as it presses the cap downwardly onto the neck of the jar to unite the cap with the jar and seal said jar.
Fig. 19 is a similar view taken on the radial line 19 of Fig. 2 and line 19—19 of Fig. 13 and shows the capped jar being ejected from the capping head.

Secured in a head 142 and extending downwardly through the tube 136, the joint 138 and the capper head 139 is a cap ejecting rod 143 which is normally held upwardly in inoperative position by a spring 144. When the rotor 36 turns, however, so that the head 142 engages the roller 106 (as shown in Fig. 19) the rod 143 is depressed to eject the cap C from the cap chuck 141 and thus prevent these cap chucks from loosening a seal previously made between the cap C and the jar 59.

Figures 16, 17:
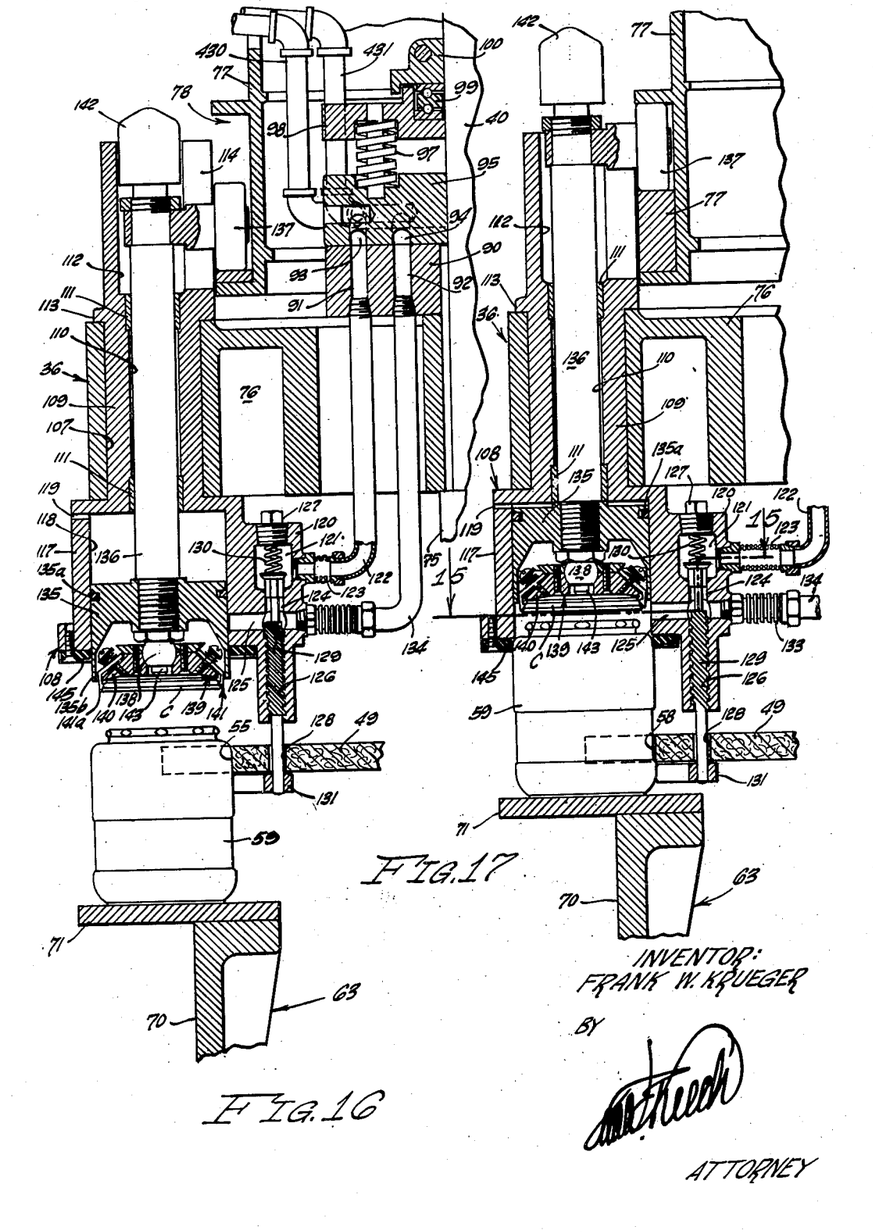
Fig. 16 is a view similar to Fig. 14 taken on the radial line 16 of Fig. 2 and line 16—16 of Fig. 12 and illustrates the capper head after it receives a cap and has started upwardly and after a jar has been positioned on the rotor table therebeneath.
Fig. 17 is a similar view taken on the radial line 17 of Fig. 2 and line 17—17 of Fig. 12 and illustrates the capper head in upwardly retracted position and the jar elevated on said rotor table forming a sealed chamber above the neck of said jar and beneath said cap and the opening of the steam valve allowing steam to be discharged into said chamber to fill the neck of said jar with steam.

Secured to the lower face of cylinder 117 is an annular rubber seal ring 145 which is adapted to make a snug sealing engagement with the upper shoulder of a jar 59 when this is presented upwardly thereagainst as shown in Fig. 17.

Delivery and discharge mechanism 37

Referring particularly to Figs. 1, 2 and 3, this mechanism is seen to include sprockets 147, 148 and 149 which lie in the same horizontal plane as the sprocket 50 and a chain 150 which is trained about these sprockets as shown in Fig. 2. This chain carries a series of jar pushers 151 which extend upwardly therefrom and travel between stationary horizontal tracks 152 flanked by guides 153 to form a jar runway 154. Jars are fed onto the runway 154 by the jar feeder 38 in a manner which will be made clear hereinafter. This is accomplished so that one jar is disposed just in advance of the pushers 151.

The tracks 152 are on substantially the same level as each of the elevator tables 71 when the latter is in its lowermost position by virtue of its roller 64 traveling in the low portion 73 of the cam path 72. These tracks 152 end as shown in Fig. 2 just outside the path followed by the tables 71 as they rotate with the rotor 36. The jars 59 are thus fed by the pushers 151 from the ends of the tracks 152 onto the respective tables 71 as these arrive opposite the tracks 152.

As each table 71 continues to travel with the rotor 36 the rollers 64 of this table enter the high portion 74 of the cam path 72 thereby elevating this table to introduce the jar 59 carried on that table into the capper unit 108 disposed immediately thereabove. The capping operation is accomplished in about 180 degrees of rotation of the rotor 36 after which each table 71 is lowered by the roller 64 thereof descending into the low portion 73 of the cam path 72. This occurs as each table 71 approaches the sprocket 147 (see Fig. 2).

Provided on the frame 26 to divert capped jars from the table 71 is a discharge chute 155 having a bottom 156 which is divided centrally to permit the pushers 151 to pass therethrough and which extends close to the path traveled by the lowered tables 71 on the rotor 36 so as to lie on substantially the same level as the lowered tables. The discharge chute 155 has side walls 157 and 158 which extend inwardly beyond the inner end of the chute bottom 156 to engage and guide jars 59 so that they will remain in front of the pushers 151 as the latter travel about the sprocket 147.

The capped jars on the lowered tables 71 are thus guided into and discharged along the chute 155 as shown in Fig. 2. The lowered tables 71 continue with the rotor 36 and are thus withdrawn from between an adjacent pair of jar pushers 151 and moved in between another pair of these jar pushers to receive another jar 59 being fed along the tracks 152 to the rotor 36.

It is to be noted that the tables 71 and the mechanisms for elevating these never interfere with the chain 150 entering or leaving meshing relation with the sprocket 50 of the rotor 36.

Jar feeder 38

Figure 4:
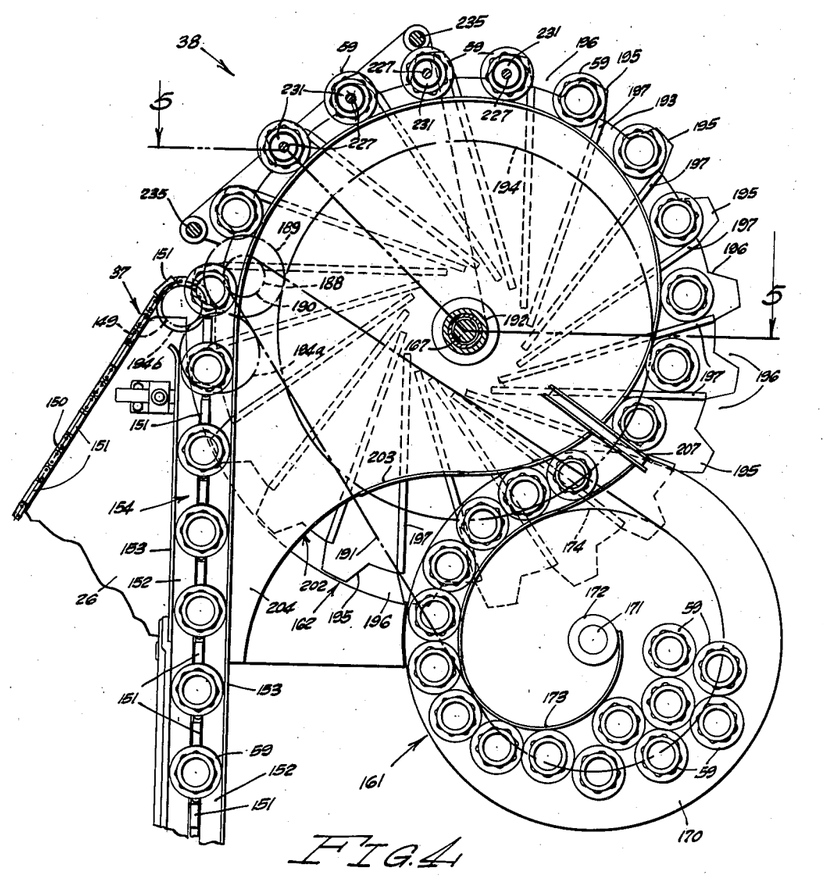
Fig. 4 is a horizontal sectional view taken on the line 4—4 of Fig. 5 and showing the container feeding mechanism of my invention.
Figures 5, 6:
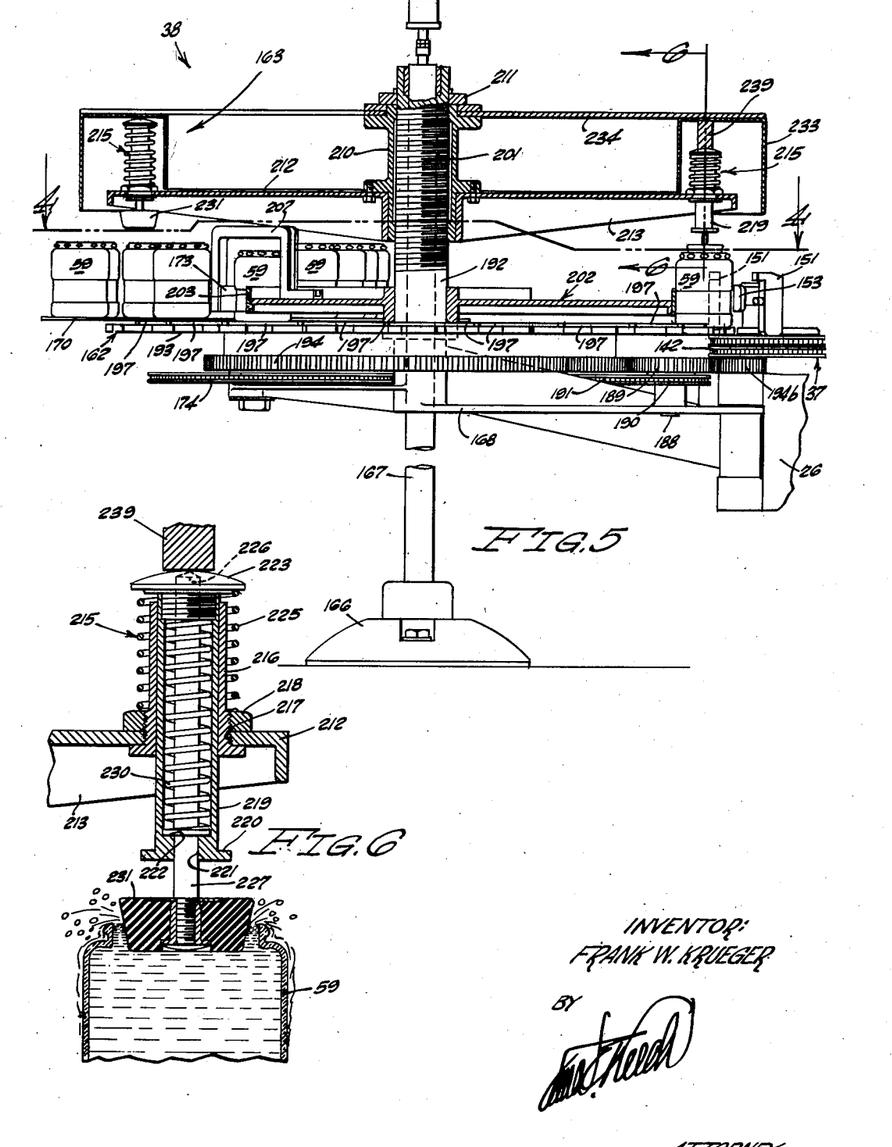
Fig. 5 is an enlarged vertical sectional view taken on the line 5—5 of Fig. 4.
Fig. 6 is an enlarged detail sectional view taken on the line 6—6 of Fig. 5 and illustrating a head spacing device of the invention.

Referring particularly to Figs. 4, 5 and 6, the jar feeder 38 is seen to include a rotary receiving conveyor 161, a rotary feeder 162 and a rotary head spacer 163.

The feeder 38 is supported on a circular pedestal 166 including a vertical shaft 167 which carries a horizontal spider frame 168, the latter being preferably connected to the frame 26 of the jar capper 25 as shown in Figs. 1 and 5.

The rotary conveyor 161 comprises a horizontal disc 170 mounted on a vertical shaft 171, the lower end of which is fixed on the frame 168. Provided on the shaft 171 is a collar 172 to which is attached one end of a container guide rail 173. The disc 170 is driven by a sprocket 174 disposed therebeneath. The frame 168 has a stub shaft 188 (see Fig. 5) on which is provided a gear pinion 189 having a sprocket 190, the latter being connected by a chain 191 to the sprocket 174 for the purpose of rotating the disc 170.

The rotary feeder 162 has a hollow vertical shaft 192 which surrounds an upper portion of the shaft 167 and rests on the frame 168. Fixed on the lower end of the shaft 192 is a feeder plate 193 having a master gear 194 which meshes with the pinion 189 so as to be driven by the latter.

Rotatable on a stub shaft (not shown) which is provided on the frame 168 is a counter gear 194—a. This gear meshes with gear 189 and with a gear 194—b which is mounted on and rotates with the sprocket 149. It is thus seen that the rotary receiving conveyor 161 and the rotary feeder 162 are driven in timed relation with the jar delivery and discharge mechanism 37 in which the sprocket 149 is rotated through the chain 150 by the sprocket 50 of the rotor 36.

The plate 193 is circular in form, the periphery thereof being notched to provide alternate jar supporting teeth 195 and 196. The upper surface of the plate 193 has rib-like jar guides 197, one of which is disposed just to the rear of each of the peripheral teeth 195, each of the guides 197 lying in a substantially spiral relation with the axis of the plate 193.

The hollow shaft 192 has a substantial portion thereof provided with external threads 201. Resting on the feeder plate 193 and centered upon an unthreaded lower portion of the hollow shaft 192 is a jar guide 202 having a jar engaging rail 203. The guide 202 has a portion 204 which is connected to the capper frame 26 to prevent this guide from rotating with the shaft 192 upon which it is centered. The guide 202 has an inverted U-shaped bracket 207 which supports the forward end of the jar guide rail 173.

The rotary head spacer 163 has an internally threaded hub 120 which screws onto the threads 201 and is held in a vertically adjustable but fixed position on the hollow shaft 192 by a nut 211. The hub 210 has a circular platform 212 which is reinforced by web-like spokes 213 and carries near its periphery a series of tamping devices 215. These devices are identical, their construction being illustrated in detail in Fig. 6.

Each such device includes a flanged sleeve 216 which is inserted upwardly in a hole 217 formed in the platform 212 and is secured therein by a lock nut 218. Inserted upwardly into the sleeve 216 is a cylindrical shell 219 having an outward flange 220 and a hole 221 forming an annular inner shoulder 222 at its lower end. Screwed into the internally threaded upper end of the shell 219 is a shell head 223 having an internal bore 226. The shell 219 is normally held in its upper position with the flange 220 thereof contacting the sleeve 216 by a coiled expansive spring 225.

Disposed within the shell 219 and extending through the hole 221 is a tamper rod 227 having a shoulder 228 fixed thereon, this normally resting against the internal shoulder 222. The upper end of the rod 227 extends a slight distance into the bore 226 when the rod 227 is yieldably held downward by a coiled expansive spring 230 in the position in which it is shown in Fig. 6.

Mounted on the lower end of the tamper rod 227 is a tamper 231 which preferably has an inverted frusto-conical shape and is adapted to readily fit inside the mouth of a jar 59.

The rotary head spacer 163 has an annular housing 233 which provides cover for that portion of the devices 215 which extend above the platform 212. This housing is supported on an overhead spider 234 which is rotatably centered on the upper end of the hub 210 and is connected by frame shafts 235 (see Figs. 1 and 4) to the under frame 168 beneath the feeder plate 193.

Mounted on the spider 234 within the housing 233 and extending downwardly along the path taken by the devices 215 as the platform 212 rotates, is a tamper operating cam 239 which is engaged by the shell heads 223 to lower each tamper 231 into the mouth of a jar 59 disposed therebeneath.

Following this action the cam 239 permits each shell head 223 to be lifted by spring 225 and thus withdraw the tamper 231 from the mouth of the jar therebeneath.

The rail 203 of the jar guide 202 is preferably shaped as shown in Fig. 4 where it is seen that, after spiralling outwardly relative to the axis of the plate 193, this rail, for a distance becomes concentric with said axis to permit the head spacer to perform its function. The rail 203 then extends tangentially from the concentric portion thereof and parallel with an adjacent portion of the runway 154 so as to be continued by the guide 153 on that side of said runway.

Cap feeding device 39

This device includes a shaft 245 mounted on the frame 26 (see Fig. 3) and having a gear 246 on its lower end which meshes with the gear 57 of the capping rotor 36 so that this shaft is rotated in timed relation with the rotor. Fixed on the shaft 245 is a cap transfer disc 248 having cap indexing pins 249. The disc 248 is adapted to present a cap C beneath each of the capping heads 139 just as the cap chuck 141 thereof moves downwardly in vertical alignment with this cap. The chuck thus picks up this cap and retains it in this head as the latter moves away from over the disc 248.

The disc 248 has a flange 253 lying flat against the upper face of the disc 248 and secured thereto. The shaft 245 journals in a bearing 255 to which is attached a cover plate 258 which overlies the disc 248 and supports a downward extending arcuate guard 259 spaced concentrically from the flange 253 so as to just allow the cap C to pass therebetween. Secured to the lower end of a pin 265 which is pivotally mounted in a boss 266 provided on the cover plate 258 (see Fig. 8) is an arm 267 which is yieldably rotated by a spring 268 coiled about the pin 265 to position each cap C uniformly inwardly against the flange 253 and against a following pin 249 as these caps are carried with the disc 248. The arm 267 has a lug 272 carrying an adjustable stop screw 273 which bears against the cover plate 258 to limit the inward position of the arm 267.

The cap feeder has a housing 286 which is mounted on the capper frame 26. This housing includes a gear box 287 and a cam box 288. Extending upwardly into the gear box 287 and journalling in a bearing 289 therein is a shaft 290 which is driven by suitable means (not shown) in timed relation with the rotor 36. Also journalled in the gear box 287 is a shaft 291 which is driven from the shaft 290 by spiral gears 292 and 293.

Journalled in bearings 300 and 301 in the cam box 288 is a cam shaft 302. Fixed on this shaft is a cylindrical cam 303 and a sprocket pinion 304, the latter being connected by a silent chain 305 to a sprocket 306 fixed on the shaft 291. Formed in the cylindrical surface of the cam 303 is a cam groove 307. Provided on shaft 302 adjacent to bearing 300 is an eccentric 308.

Formed internally in the cam box 288 (Fig. 9) is a boss 309 having a vertical bore 310 therein with a counterbore 311 in its upper end. Secured in place in the bore 310 as by screws 312 is a bushing 313. Extending through the boss 309 and the bushing 313 is a vacuum duct 314 and a vacuum release passage 315. Vertically slideable within the bushing 313 is a tubular vacuum cup plunger 316, the lower end of which is internally threaded to receive a cap screw 317 which secures a pin block 318 to the lower end of the plunger 316.

Formed on this block is a crank pin 319 which is connected by a crank 320 with the eccentric 308. The plunger 316 has a port 325 controlling the formation and releasing of vacuum within the plunger. The upper end of the plunger is internally threaded to receive a threaded sleeve 326 in which is mounted a vacuum cup unit 327. This unit includes a flanged hollow stem 328 which is slideable in the sleeve 326. A flanged collar 329 rests on top of the stem 328 and a cap screw 330 extends downwardly through this collar and is screwed into the upper threaded end of stem 328 so as to centrally grip and support a vacuum cup 331 at the upper end of the unit 327. Disposed within the cup plunger 326 is an expansion spring 332 which yieldably holds the unit 327 in its upwardmost position in the sleeve 326 as shown in Fig. 9.

The vacuum passage 314 connects with a pipe 333 which leads to a suitable vacuum tank 340 (not shown).

Figure 9:
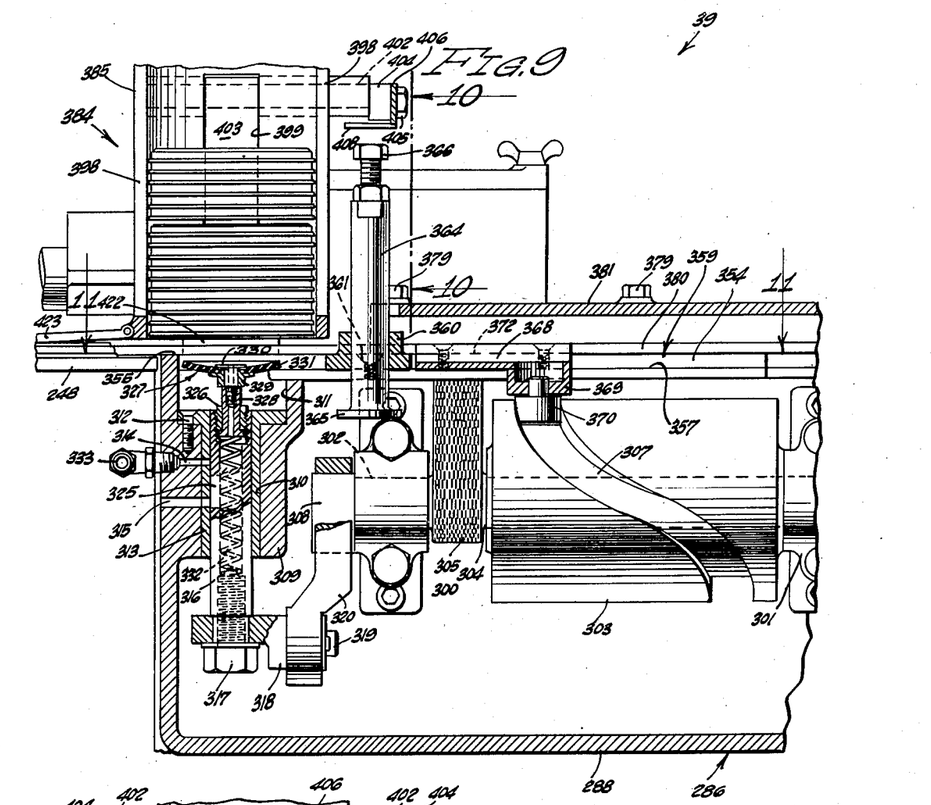
Fig. 9 is a vertical sectional view taken on the line 9—9 of Fig. 7 and illustrating the operating mechanism of said cap feeder.
Figure 10:
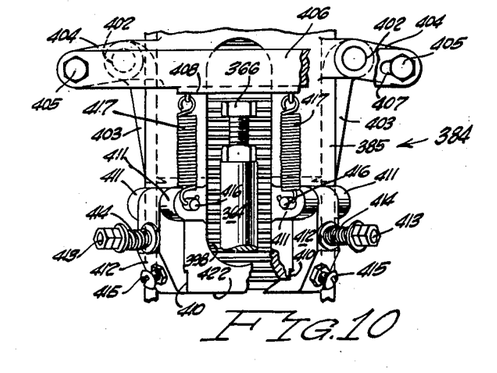
Fig. 10 is a fragmentary elevational view taken on the line 10—10 of Fig. 9.
Figure 11:
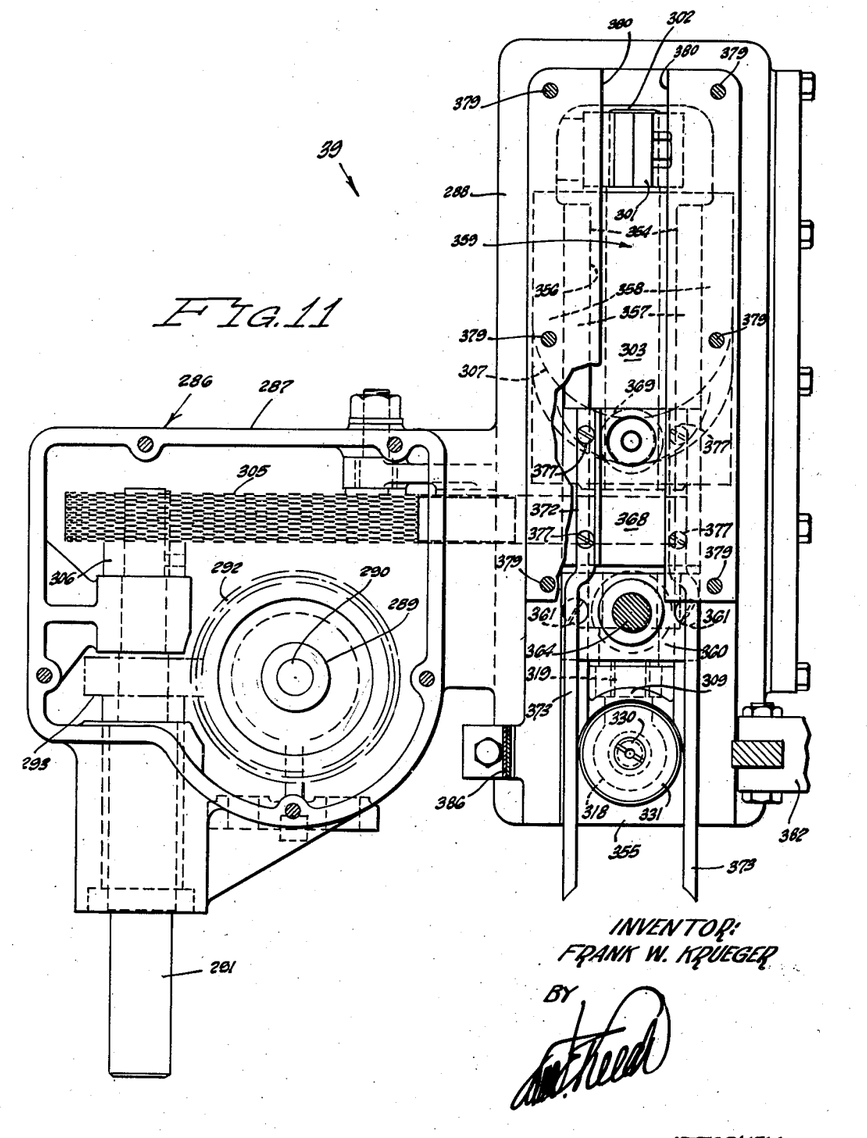
Fig. 11 is a horizontal sectional view of said cap feeder taken on the line 11—11 of Fig. 9.

Referring now to Figs. 9 and 11, it will be seen that the cam box 288 has a top wall 354 which unites with the upper end of the boss 309, this top wall having a central opening 356 formed longitudinally therein. The upper portions of edges of this opening are milled away to provide a pair of opposed parallel slide flanges 357 and guide shoulders 358 which unite to form a crosshead slideway 359.

Just over the crank 320 and bearing 300 is lifter guide plate 360 which is held in place by screws 361 which are screwed into suitable threaded holes in side flanges 357. Guided vertically in a bore provided in plate 360 is a lifter 364, the lower end of which is provided with a contact flange 365 and the upper end of which has an extension screw 366.

The lifter 364 normally rests in its downward position (shown in Fig. 9) in which the flange 365 engages bearing 300.

Seated in the slideway 359 is a crosshead 368, the body of which extends above the upper face of the top wall 354 and which has a downward extending boss 369 on which is carried a cam responsive roller 370 which extends into the cam groove 307.

Mounted in suitable grooves formed in the upper face of the crosshead 368 are shanks 372 of cap feeder fingers 373, said fingers resting slideably on the upper face of the guide plate 360. The shanks 372 are secured in place on the crosshead as by flathead screws 377. Secured downwardly onto the top wall 354 as by cap screws 379 are gib plates 380 and a cap plate 381 (see Fig. 9). The gib plates 380 slideably hold the cross head 368 in the slideway 359 and thus complete the latter. It is to be noted that the cap feeder 39 is mounted on the jar capper 25 so that the upper face 355 of the top wall 354 is disposed just a slight distance above the surface of the cap transfer disc 248 (see Fig. 9). As the upper face of the plate 360 is flush with the upper surface 355 of the top wall 354, the cap feeder fingers 373 operate slideably above and in sliding contact with the surface 355.

Connected to the cam box 288 by a hinge 382 is a cap magazine 384. This magazine has a tubular body 385 to which the hinge 382 connects and which is engaged by a leaf spring 386 provided on the cam box 288 to latch the magazine in operative position as shown in Figs. 1, 7, 9 and 10.

The magazine body 385 has opposed vertical sight slots 398 and at right angles thereto is provided with shorter slots 399. Mounted on suitable bearings near the upper end of the body are shafts 402, each shaft carrying a claw 403 and an arm 404 which is provided with bolts 405. Connecting the bolts 405 loosely is a link 406, this receiving one of the bolts 405 through a slot 407 and having a central horizontal bottom flange 408. This flange is disposed directly above the adjustable extension screw 366.

The magazine body 385 also has four openings 410 formed therein adjacent the bottom edge thereof. Pivotally between lugs 411 disposed above each of the openings 410 is a stripper jaw 412 through which a bolt 413 fixed in the body 385 extends. This bolt holds a compression spring 414 adjustably against jaw 412 to press this inwardly through the opening 410. Extending through the jaw 412 is a set screw 415 which engages the body 385 and adjustably determines the distance which the jaw 412 extends inwardly through the opening 410. The jaw 412 is pivoted on pins 416 provided in the lugs 411 and these pins serve to anchor the lower ends of contractile springs 417, the upper ends of which hook through openings in the flange 408 so that these springs continually urge the claws 403 inwardly through the holes 399 excepting when the pull of these springs is opposed by the lifter 364 lifting the link 406.

The lower end of the magazine body 385 is cut away (see Fig. 9) to form a passage 422 which is approximately of the same width as the internal diameter of the magazine body 385. This passage extends parallel with the feeder fingers 373 which are reciprocated through this passageway to eject caps C therefrom as will be made clear hereinafter. Hingedly mounted on the body 385 (see Figs. 7 and 9) so as to overlie the transfer disc 248 and rest on the hub flange 253 thereof is a cap hold-down plate 423.

*Operation*

In preparing the capper 25 for operation, live steam is supplied to the steam passage 93 through a pipe 430 (see Fig. 16) and provision is made for exhausting waste steam from exhaust steam passage 94 through a similar pipe 431. The magazine 384 of the cap feeder 39 is also supplied with a stack of caps C as shown in Figs. 1 and 9. Air from a suitable source under a constant pressure, preferably about 10 pounds per square inch, is supplied to the air cylinder 81. The pipe 333, as aforesaid, is also connected with a vacuum tank. Jars 59 which have previously been filled with a product to be canned are now fed onto the horizontal disc 170 of the rotary receiving conveyor 161 as shown in Fig. 4.

The capper 25 is now started by energizing the electric motor 44 which rotates the capping rotor 36 and thereby sets in motion the other mechanisms of the capper.

The discs 170 and 193 of the jar feeder 38 are thus caused to rotate in opposite directions as indicated by the arrows in Fig. 4. The jars 59 which are set at random on the disc 170, are crowded into a single file row and then fed in an orderly sequence onto the disc 193 which delivers them in exactly spaced and timed relation onto the jar runway 154, each jar being placed between an adjacent pair of the jar pushers 151.

The accurate spacing is accomplished by the rib-like guides 197 on the disc 193. While the jars are resting on the teeth 195 of the plate 193 spaced uniformly from the axis of this plate with the jars engaging the concentric portion of the jar engaging rail 203, each of these jars is disposed beneath one of the tamping devices 215 and the tamper 231 thereof is depressed into this jar by the cam 239 so as to leave this jar containing an exactly predetermined amount of contents so that when the jars are capped in the capper 25 their contents will be uniform. As the tamping devices 215 move beyond the cam 239 the tampers 231 are lifted out of the jars 59 and the latter are free to be transferred from the plate 193 to the runway 154.

The jars 59 thus fed onto the runway 154 are propelled therealong by the jar pushers 151 and each of these jars is delivered onto one of the elevator tables 71 as the latter is extended beneath this jar while the jar is still traveling between the guide rails 153 of the runway 154 but is being propelled by a jar pusher 151 beyond the inner ends of the tracks 152 as shown in Fig. 2.

As each jar is thus delivered onto one of the elevator tables 71 it is inserted into one of the notches 58 of the jar locating disc 49 before this jar is out from between the guide rails 153. This delivery causes this jar to engage the adjacent jar responsive arm 131 which rotates and opens the steam valve 129 of the capper unit 108 thereabove so that steam is supplied to this unit in the subsequent operation of steaming and capping this jar.

At the time each jar is thus delivered beneath one of the capper units 108 the capper head 139 of that unit contains a cap held in the chuck 141 thereof which had just previously been received from the cap transfer disc 248.

The functioning of the cap feeder 39 to deliver a cap C to the disc 248 is as follows: Through the drive connection between cap feeder 39 and the capping rotor 36, the shaft 302 together with the cam 303 and eccentric 308 provided thereon is given one revolution for each one-tenth revolution of the capping rotor 36. There are ten capping units 108 on the rotor 36 and the feeder 39 thus feeds one cap to the disc 248 for each of these units during each revolution of the rotor 36.

The bottommost cap C is engaged by the vacuum cup 331 on the plunger 316 as the latter is elevated by the eccentric 308 and the evacuation of air from between this cup and the lowermost cap causes the latter to be pulled downwardly with this cap as the plunger 316 descends. This delivers this cap into the path of the cap feeder fingers 373 just before these are extended through the bottom of the magazine 384 by the action of the cam groove 307 on the roller 370. As the plunger 316 is lowered after thus pulling a cap downwardly, the port 325 in the plunger moves out of registry with the vacuum duct 314 and into registry with the release passage 315. This releases the vacuum between the vacuum cup 331 and the cap C engaged thereby so that this cap may respond to the fingers 373 and be fed out onto the disc 248.

Figures 7, 8:
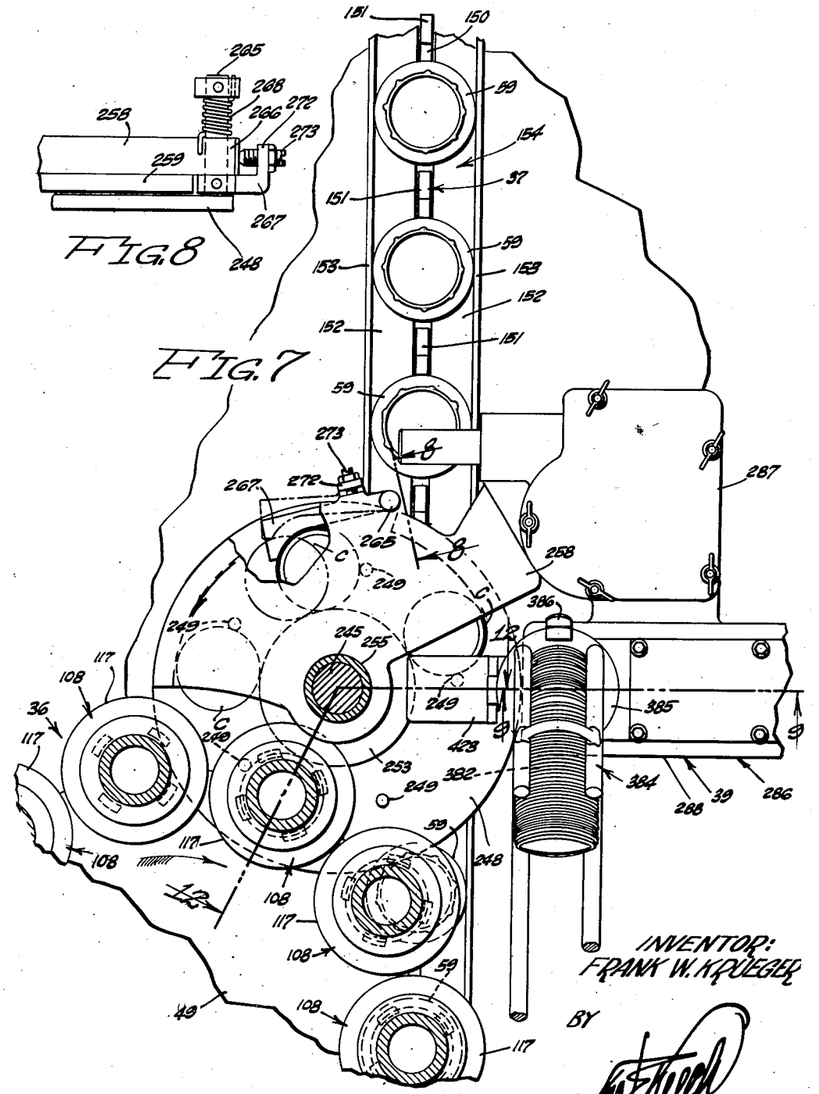
Fig. 7 is an enlarged fragmentary horizontal sectional view taken on the line 7—7 of Fig. 3 and illustrating the cap feeding device of the apparatus of my invention.
Fig. 8 is an enlarged detail sectional view taken on the line 8—8 of Fig. 7.
Figures 14, 15:
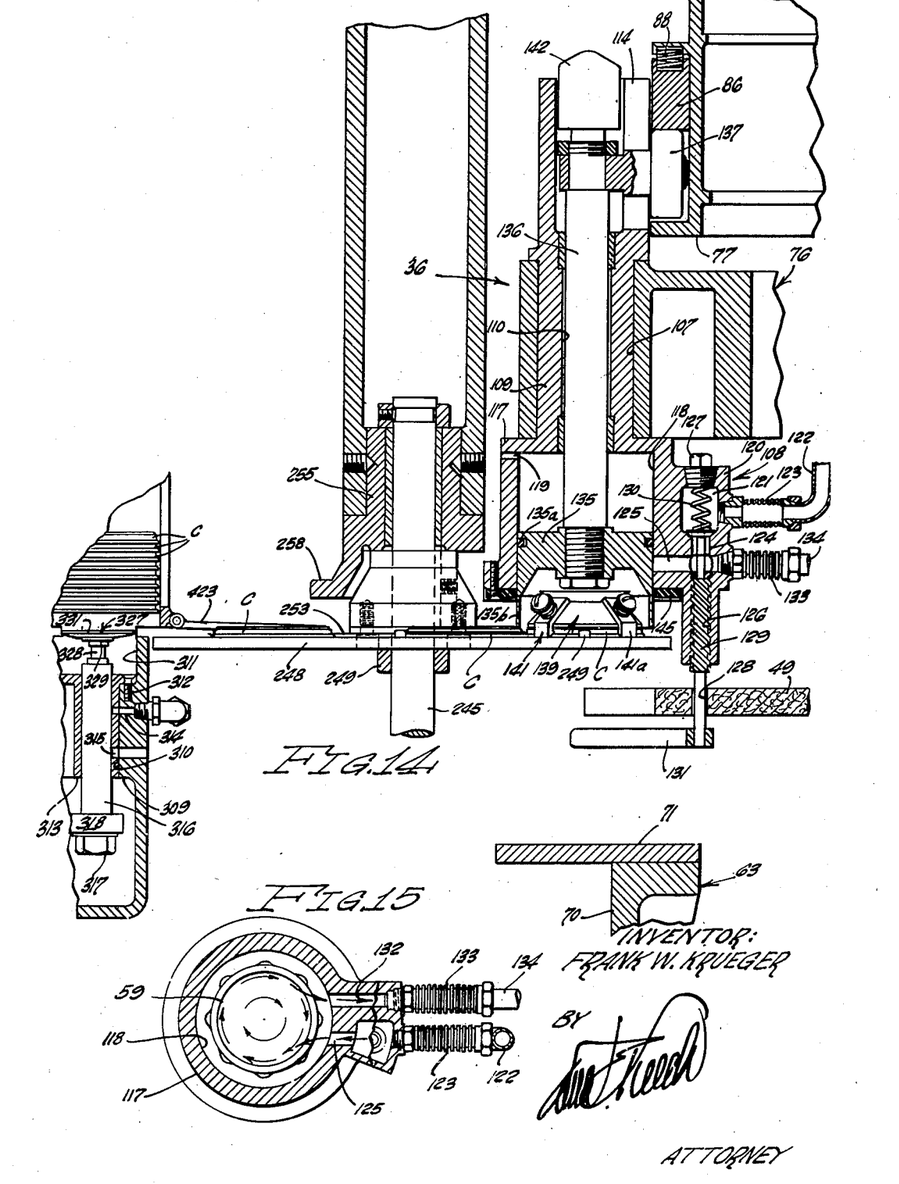
Fig. 14 is a diagrammatic fragmentary vertical sectional view taken on the radial line 14 of Fig. 2 and the line 14—14 of Fig. 12 and illustrating a capper head in the act of picking up a cap from the cap feeding disc.
Fig. 15 is a cross sectional view taken on the line 15—15 of Fig. 17 and illustrates the method of delivering steam into the upper end of a jar in my invention.

The feeding of caps in this manner is so timed that each cap is deposited just in advance of a pin 249 and, as shown in Fig. 7 is delivered beneath one of the units 108 just in time to be engaged by the cap chuck 141 of this unit as shown in Fig. 14. Here it is seen that the roller 137 engages the upper cam wall 86 which yieldably presses the chuck 141 down causing the cap thereunderneath to spring the arms 148 outwardly. Thus when this chuck is lifted by roller 137 as illustrated at line 16—16 in Fig. 12, the cap C is carried away by this chuck.

As the rotor 36 moves this particular jar 59 between the position in which it is shown in Fig. 16 and the position in which it is shown in Fig. 17, the elevator table 71 on which it rests is lifted to bring the upper shoulder of the jar into sealing relation with the seal ring 145, while engagement of the roller 137 with the lower wall of the cam 177 lifts the capper head 139 of this unit upwardly into its uppermost position in the chamber 118. This spaces the cap C held in the chuck 141 above the open upper end of the jar 59 to form a space through which steam may enter to remove the air from the space in the mouth of the jar above the product contained therein.

Withdrawal upward of the plunger 135 also shifts the valve sleeve 135—b upwardly to uncover the steam injection passage 125 and exhaust passage 132. As the valve 129 is at this time being held open by engagement of the jar 59 with the arm 131, steam flows from the steam pipe 122 past the valve 129 and through the passage 125 into the chamber 118. This steam enters this chamber tangentially as shown in Fig. 15 and in the plane of the space between the upper end of the jar and the cap C.

The steam thus entering the chamber 118 flows through the space between the cap and the top of the jar so as to form a vortex of steam in this space which displaces the air from the upper end of the jar causing this air to be discharged with the steam escaping from the chamber 118 through the exhaust passage 132. The open space in the upper end of the jar 59 and between this and the cap C is thus completely filled with steam.

The steaming step just described continues as the capper unit 108, in which this takes place, travels on the rotor 36 from the position indicated by line 17 in Figs. 2 and 12 until just before this capper unit arrives in the position indicated by line 18 in said views. That is, the steaming operation continues until the capping operation, which takes place when the roller 137 of that capper unit, engages the upper cam wall 80 which depresses the capper head 139 a sufficient distance to press the cap C carried by this head onto the jar 59 as shown in Fig. 18. The depression of tube 136 to accomplish this slides the plunger 135 and sleeve 135—b thereof downwardly in the chamber 118 so as to close the steam inlet and exhaust passages 125 and 132.

As the rotation of the capping rotor 36 continues the rollers 64 in the cam passage 72 and the roller 137 in the cam passage 78 arrive at the ends of the upper portions 74 and 79 respectively of these cam passages and start downwardly as shown at line 19—19 of Fig. 13. This causes a lowering of the elevator table 71 and capper head 139 as shown in Fig. 12.

As this proceeds, the elevator table is lowered faster than the capper head 139. As soon as this causes the capped jar 59 to hang by its cap from the chuck 141, the head 142 of the cap ejecting rod 143 engages the overhead roller 106 which depresses this rod to compress the spring 144 and cause the lower end of the rod to positively eject the capped jar from the chuck 141 as shown in Fig. 19.

When the capped jar is thus ejected the elevator table 71 is being rapidly lowered to the level of the discharge chute 156 and the capped jar resting on this table arrives between the side walls 157 and 158. At this point the chain 150 and jar pushers start around the sprocket 147, the pitch line of which is located in the center of the discharge chute 155. The jar pusher 151 behind each capped jar entering this chute thus propels this jar along this chute and away from over the elevator table 71 which carried this jar to this chute. This jar is thus propelled by this pusher 151 until the latter travels about the sprocket 148 and thereby moves out of the chute 155. This chute is preferably inclined downwardly where it leads away from the sprocket 148 so that the capped jars slide down this chute by gravity after they leave contact with the pushers 151.

Just after the ejection of the capped jar from the capper chuck 141, as shown in Fig. 19, the roller 137 moves into contact with a boss 425 on the lower cam 66 which lies just ahead of the upper cam wall 86 (see Fig. 12). Engagement with this boss lifts the roller 137 and its capper head 139 so that as this capper head approaches the position indicated by line 14 in Fig. 2 and line 14—14 in Fig. 12, this capper head is suspended high enough on the capping rotor 36 so as to clear the cap C being conveyed on the cap transfer disc 248 as shown in Fig. 7 into position to be picked up by this particular capper head. Thus when this capper head arrives at the position indicated on line 14 and is depressed by engagement of its roller 137 with the upper cam wall 86 (see Fig. 12) the spring arms 141—a of its cap chuck are spread into expanded gripping relation with said cap.

A complete cycle of operation of a cap unit 108 has now been described. This cycle is repeated over and over by each of the capper units on the rotor 36 as long as the machine is in operation.

It is to be noted that whenever a jar is not present on an elevator table 71 so as to engage the arm 131 thereabove and thereby rotate and open the valve 129 associated therewith, this valve remains closed so that no steam can be fed to this capper unit. This is for the purpose of preventing the escape of steam from any of the capper units 108 when, for some reason during the operation of the machine, a jar is not fed to that unit. In other words, when a jar is not fed to the elevator table 71 of a unit 108, when this comes into position to receive a jar, that unit travels a complete revolution with the capper rotor 36 with steam valve 129 of that unit closed as shown in Fig. 14.

It is also to be noted that the ball and socket mounting of the capper head 139 on the plunger 135 permits the capper head to rotate about the center of this so as to uniformly press all peripheral portions of a cap onto a jar regardless of whether the plane of the mouth of this jar is at right angles to the axis of this capper unit or not. Occasionally jars 59 are thus deformed and this feature of my invention adapts the capper head to the jar and insures a good seal being effected in each capping operation.

I have also discovered that application of the cap C to a container such as a jar 59 with a beveled face 140 on the capper head where this engages the periphery of the cap deflects the rim of the cap downwardly into an especially tight sealing relation with the extreme outer edge of the neck of the jar and that this is instrumental in forming a uniformally tight seal between the cap and the jar.

Jars 59 also differ somewhat in height and the air cylinder 81 of my invention is provided with the upper cam wall 80 to yield during the capping operation a sufficient distance to allow for variations in the heights of the jars capped. I have found that a constant pressure of about 10 pounds per square inch in the cylinder 81 is preferable.

While I have shown and described herein only a single preferred embodiment of my invention, it is to be understood that various changes may be made on this without departing from the spirit of the invention or the scope of appended claims.

What I claim is:

1. An apparatus for vacuum capping containers which comprises: a table for supporting a container; a cylinder disposed above said container and in axial alignment therewith to provide a steam chamber; a plunger axially slideable in said cylinder; a capper provided on the bottom of said plunger; annular seal means on said cylinder surrounding the lower end thereof and adapted to engage said container; means causing relative vertical movement between said cylinder and said container supporting table to bring the upper end of said container and said seal means into sealing engagement, there being opening means in the wall of said cylinder for admitting steam thereto; and means operating in timed relation with said movement means for lifting said plunger upwardly in said cylinder so as to uncover said opening means and fill said chamber with steam between said capper and the upper end of said container when the latter engages said seal means and for then moving said capper downwardly to apply said cap to said container while surrounded by an atmosphere of steam.

2. A combination as in claim 1 in which said steam opening means in the wall of said cylinder is disposed tangentially with respect to the axis of said steam chamber.

3. An apparatus for capping containers which comprises: a capper head; chuck means on said head for supporting a cap when applied thereto; means for reciprocating said capper head to press said cap onto a container; and means for pressing said cap on said container while said chuck means is being withdrawn with said head from engagement with said cap.

4. An apparatus for capping containers which comprises: a capper head; chuck means on said head for supporting a cap when applied thereto; means for reciprocating said capper head to press said cap onto a container; means on said head adapted to contact said cap; and means operating in timed relation with said head reciprocating means for pressing said contact means against said cap to hold said cap on said container while said chuck means is being withdrawn with said head from contact with said cap.

5. An apparatus for capping containers which comprises: means for supporting a container; a capper head; means for reciprocating said head to press a cap on said container; universal connection means for connecting said head to said reciprocating means; a rod extending vertically through said universal means and adapted to engage said cap; and means operating in timed relation with said reciprocating means to press said rod against said cap to hold said cap on said container while said capper head is being withdrawn from engagement with said cap.

6. An apparatus for capping containers which comprises: a rotor; means for supporting a container on said rotor; a capper head; a cam means for reciprocating said capper head towards and away from said container; and a yieldably pressed cam section into operative relation with which said capper head moves as said rotor rotates and which imparts a yieldable pressure to said capper head to press a cap onto said container, said cam section compensating for variations in the height of said container.

7. An apparatus for vacuum capping containers which comprises: a table for supporting a container; a cylinder disposed above said container and in axial alignment therewith; a plunger axially slideable in said cylinder; a capper provided on the bottom of said plunger, there being opening means in the wall of said cylinder for admitting steam thereto, said plunger covering said opening means when it is in capping position; means for elevating said table for lifting a container upwardly to the lower end of said cylinder; and means operating in timed relation with said table lifting means for lifting said plunger upwardly in said cylinder so as to uncover said opening means permitting steam to be discharged therefrom between said capper and the upper end of said container, and for then moving said capper downwardly to apply said cap to said container before the steam between said capper and said container has condensed.

8. An apparatus for capping containers which comprises: means for supporting a container; a capper head; means for reciprocating said head to press a cap on said container; a rod extending vertically through said head and adapted to engage said cap; and means operating in timed relation with said reciprocating means to press said rod against said cap to hold said cap on said container after applied thereto by said capper head and while the latter is being withdrawn from engagement with said capper.

FRANK W. KRUEGER.

REFERENCES CITED

The following references are of record in the file of this patent:

UNITED STATES PATENTS

| Number | Name | Date |
|---|---|---|
| 831,527 | Landsberger | Sept. 18, 1906 |
| 2,120,272 | Williams et al. | June 14, 1938 |
| 2,126,942 | Barnby | Aug. 16, 1938 |
| 2,338,047 | Minaker | Dec. 28, 1943 |
| 2,339,035 | Stewart et al. | June 11, 1944 |